United States Patent
Kaplan et al.

(10) Patent No.: US 6,372,370 B1
(45) Date of Patent: Apr. 16, 2002

(54) AIR RECOVERY BATTERY

(75) Inventors: Alexander Kaplan, Providence, RI (US); Viet H. Vu, Middleton, WI (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 09/487,355

(22) Filed: Jan. 19, 2000

(51) Int. Cl.$^7$ .............................................. H01M 12/08
(52) U.S. Cl. ............................ 429/27; 429/29; 429/40; 429/164
(58) Field of Search ........................ 429/27, 40, 164, 429/29

(56) References Cited

U.S. PATENT DOCUMENTS

| 3,698,956 A | 10/1972 | Masayuki et al. ......... 136/86 A |
| 3,837,921 A | 9/1974 | Henssen ................... 136/86 A |
| 3,869,314 A | 3/1975 | Gillespie .................. 136/86 A |
| 3,871,920 A | 3/1975 | Grebier .................... 136/86 A |
| 3,920,475 A | 11/1975 | Nabiullin et al. ......... 136/86 A |
| 3,928,072 A | 12/1975 | Gerbier et al. ............ 136/86 A |
| 5,079,106 A | 1/1992 | Urry ........................... 429/27 |
| 5,229,223 A | 7/1993 | Hyland ....................... 429/29 |
| 5,248,568 A | 9/1993 | Getz ........................... 429/56 |
| 5,270,128 A | 12/1993 | Reichert et al. ............... 429/29 |
| 5,518,834 A | 5/1996 | Yoshizawa et al. |
| 5,518,835 A | 5/1996 | Simmonds |
| 6,197,445 B1 * | 3/2001 | Ward et al. ............. 429/164 X |

FOREIGN PATENT DOCUMENTS

| EP | 0 441 592 A2 | 8/1991 |
| EP | 0 540 324 A2 | 5/1993 |
| EP | 0 567 242 A1 | 10/1993 |
| JP | 08162173 A | 6/1996 |
| JP | 08306398 A | 11/1996 |
| SU | 1048602 | 2/1979 |
| WO | WO 00/54360 | 9/2000 |

OTHER PUBLICATIONS

Cegasa literature on Advanced Battery Technology, Aug. 1983.

* cited by examiner

Primary Examiner—John S. Maples
(74) Attorney, Agent, or Firm—Fish & Richardson P.C.

(57) ABSTRACT

An air recovery battery is disclosed along with a method of assembling a battery including (a) inserting a cathode assembly in a can having a wall, the wall having at least one air access opening; (b) placing anode material in the can; (c) inserting a seal assembly into the can, the seal assembly having a current collector; and (d) sealing the can.

12 Claims, 5 Drawing Sheets

Experimented Air Assisted Alkaline

AIR RECOVERY BATTERY

BACKGROUND

This invention generally relates to air recovery electrochemical cells.

Batteries are commonly used electrical energy sources. A battery contains a negative electrode, typically called an anode, and a positive electrode, typically called a cathode. The anode contains an active material that can be oxidized; the cathode contains an active material that can be reduced. The anode active material is capable of reducing the cathode active material. In order to prevent direct reaction of the anode material and the cathode material, the anode and the cathode are electrically isolated from each other by a separator.

When the battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

An air recovery battery, also known as an air assisted or air restored battery, is a battery that uses air to recharge its cathode during periods of low or no discharge. One type of air recovery battery employs zinc powder as the anode, manganese dioxide ($MnO_2$) as the cathode, and an aqueous solution of potassium hydroxide as the electrolyte. At the anode, zinc is oxidized to zincate:

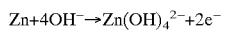

$$Zn + 4OH^- \rightarrow Zn(OH)_4^{2-} + 2e^-$$

At the cathode, $MnO_2$ is reduced to manganese oxyhydrate:

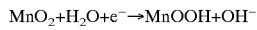

$$MnO_2 + H_2O + e^- \rightarrow MnOOH + OH^-$$

When the cell is not in use or when the rate of discharge is sufficiently slow, atmospheric oxygen enters the cell and reacts with the cathode. Manganese oxyhydrate is oxidized to form $MnO_2$:

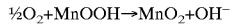

$$\tfrac{1}{2}O_2 + MnOOH \rightarrow MnO_2 + OH^-$$

During high rates of discharge, air recovery batteries operate like conventional alkaline cell by reducing "fresh" (unreduced) $MnO_2$. During low rates of discharge and periods of rest with no current flow, the "consumed" (reduced) $MnO_2$ is restored or recharged by atmospheric oxygen to the fresh state. Since oxygen must reach the $MnO_2$ for recharging, the cathode of the battery must not be wetted completely by electrolyte. If the cathode is soaked with wet electrolyte, air transport properties inside the cathode degrade and recharging of $MnO_2$ is hampered.

SUMMARY OF THE INVENTION

The invention generally relates to air recovery batteries that provide good air distribution to the cathode and protection against leakage of electrolyte.

In one aspect, the invention features a method of assembling an air recovery battery. The method includes (a) inserting a cathode assembly in a can having a wall, the wall having at least one air access opening; (b) placing anode material in the can; (c) inserting a seal assembly into the can, the seal assembly having a current collector; and (d) sealing the can. The air access opening(s) can reduce the diffusion path length for air entering the cell, thereby improving the recharging efficiency of the cell.

In another aspect, the invention features a method of assembling an air recovery battery including (a) placing a bottom cup on an end of a cathode assembly; (b) inserting the cathode assembly and the bottom cup in the can; (c) placing anode material into the can; (d) inserting a seal assembly into the can, the seal assembly having a current collector; and (e) sealing the can. The method can also include placing a barrier layer adjacent to the cathode, forming a groove in the can, and placing an air diffusion layer adjacent to the barrier layer. The bottom cup may allow the cathode to make better electrical contact with the can and generally provides protection against leakage of electrolyte. The groove and air diffusion layer can restrict the cathode assembly from obstructing the air access opening(s).

In another aspect, the invention features an air recovery battery including a can having a wall; at least one air access opening in the wall of the can; anode material disposed in the can; and a cathode assembly in the can.

In another aspect, the invention features an air recovery battery including a can; a cathode assembly in the can; a bottom cup disposed on an end of the cathode assembly; and anode material disposed inside the can. These batteries can include a barrier layer, a groove in the can, and an air diffusion layer. The battery can be a cylindrical battery and/or an air recovery battery.

Other features and advantages of the invention will be apparent from the description of the preferred embodiment thereof, and from the claims.

DESCRIPTION OF THE PREFERRED EMBODIMENTS

Figure 1:
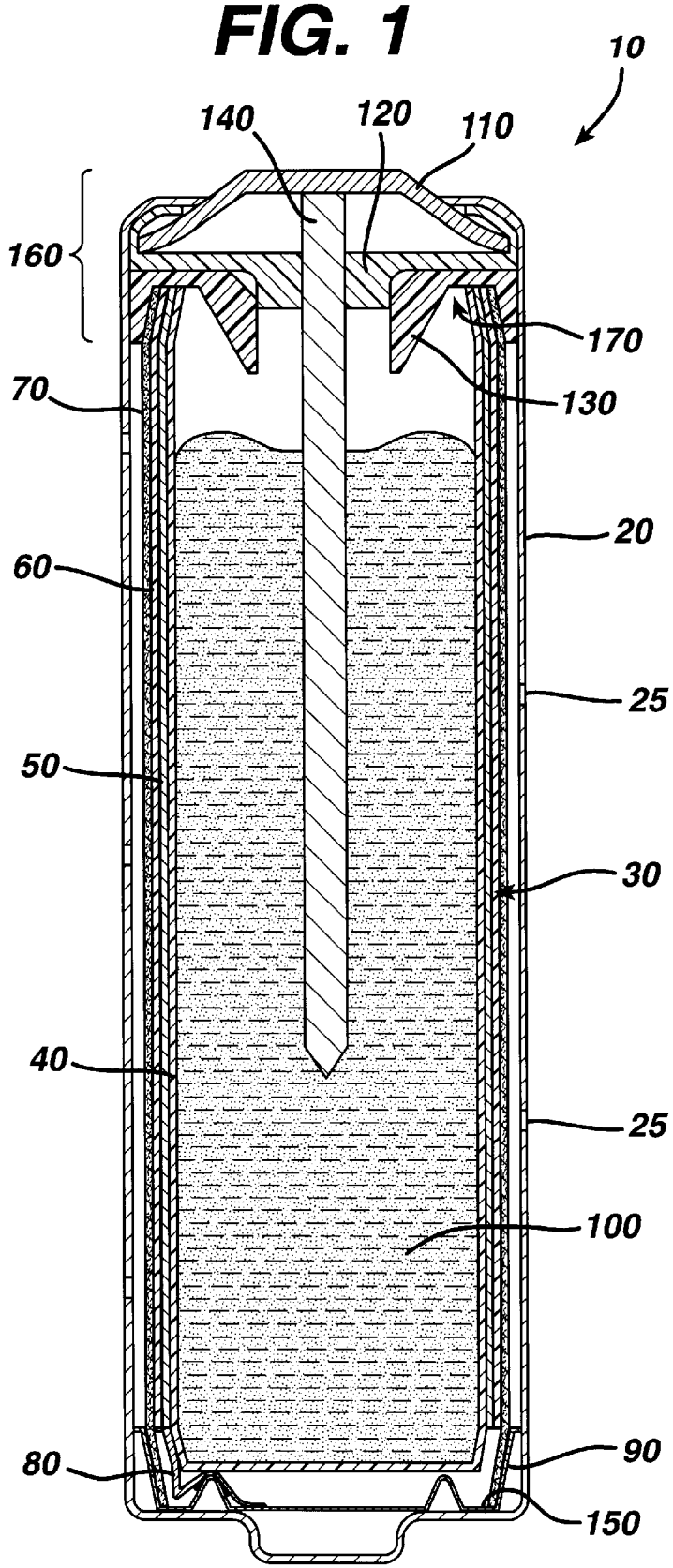
FIG. 1 is a cross-sectional view of a cylindrical air recovery battery.

Referring to FIG. 1, a cylindrical air recovery battery 10 includes a can 20 having a wall with at least one air access opening 25 in the wall of the can 20. The can 20 includes a cathode assembly 30 formed to fit inside the can 20 to define a cavity. The cathode assembly 30 includes a separator 40, a cathode 50, a barrier layer 60, and an air diffusion layer 70. The cathode assembly 30 further includes a tab 80 welded to the cathode 50, and a bottom cup 90 placed on an end of the cathode assembly 30 and welded to the tab 80. Disposed inside the cavity of the cathode assembly 30 is an anode 100. Disposed on another end of the cathode assembly 30 is a sealing assembly 160 including a current collector 140. The can 20 is sealed, e.g., by a mechanical crimp, to form the battery 10. Generally, the method of assembling the battery 10 includes placing the cathode assembly 30 and the anode 100 into the can 20, and sealing the can 20 to form the battery 10.

The battery dimensions depend on the application or use for the cell. Overall dimensions of the can 20 are specified by the International Electrotechnical Commission (IEC). For examples, cylindrical AAAA, AAA, AA, C, or D cells can be prepared. The can is typically made of nickel-plated steel (Thomas Steel Co., Charlotte, N.C.).

The rechargeability of the cathode 50 is governed in part by the diffusion rate of atmospheric oxygen into the cathode 50 and the rate of chemical reaction between oxygen and $MnO_2$. Opening(s) 25 allows air to reach the cathode 40 so that the $MnO_2$ cathode can be recharged. Maximizing the number of openings 25 in the can 20 can optimize performance of the battery 10 but can also increase costs of manufacturing. The opening(s) 25 can be placed in the wall of the can 20 and/or in the ends of the can 20. The opening(s) 25 placed in the wall of the can 20 may decrease the diffusion path for air entering the can 20, thereby improving the recharging efficiency of the battery 10. Openings 25 generally have a diameter of about 0.3 mm and are typically formed by laser drilling. For uniform performance, openings 25 are typically uniformly distributed on the can 20. An exemplary pattern showing a distribution of openings on a steel sheet for a AA can is provided in FIG. 2.

The cathode 50 is formed on a current collector (not shown) to improve the conductivity characteristics of the cathode 50. The current collector is a grid of expanded, electrically conducting metal or an alloy, such as nickel-plated steel. The grid can make forming the cathode 50 to a desired shape easier and can help the cathode 50 make better electrical contact with the tab 80 and the bottom cup 90, as described below.

The cathode 50 can include a mixture of materials, including $MnO_2$, a hydrophobic binder, and carbon particles. Cathode 50 preferably is formed on a nickel-plated steel grid. The grid serves as a current collector for the cathode 50 and is typically welded to the cathode can 20 to provide good electrical contact. The cathode 50 can include 60–93%, preferably 80–93%, of $MnO_2$ and 2–25% of a binder, with the balance being carbon particles. The cathode 50 preferably is 0.4 to 1.4 mm thick, although specific dimensions of the cathode 50 are a function of the size of the battery 10 and application, e.g., depth of discharge. The $MnO_2$ in the cathode 50 can include electrolytically synthesized $MnO_2$ (EMD), chemically synthesized $MnO_2$ (CMD), blends of EMD and CMD, or chemically modified $MnO_2$ (p-CMD). Preferably, the cathode 50 includes EMD. The $MnO_2$ in the cathode 50 can be obtained, e.g., from Kerr-McGee Chemical Corp. (Henderson, Nev.).

The binder can be a polymer such as polytetrafluoroethylene (PTFE), another fluoroethylene, or polyethylene, and is present in an amount sufficient to produce wet-proofing (i.e., to limit flooding of the cathode by the electrolyte) without hindering the electrochemical reaction involving the discharge of $MnO_2$.

For a gas diffusion electrode to be effective, a balance between electronic conductivity, ionic conductivity and gas diffusion properties must be optimized. This balance can be accomplished in a cathode with effective quantities of binder, $MnO_2$ and carbon. A cathode too highly electrolyte repellent may be effective against electrolyte penetration and effective for gas transport properties, but it may have poor ionic conductivity and discharge efficiency of $MnO_2$. The rechargeability of the cathode 50 is governed by the diffusion rate of atmospheric oxygen into the cathode 50 and the rate of chemical reaction between oxygen and $MnO_2$.

Figure 2:
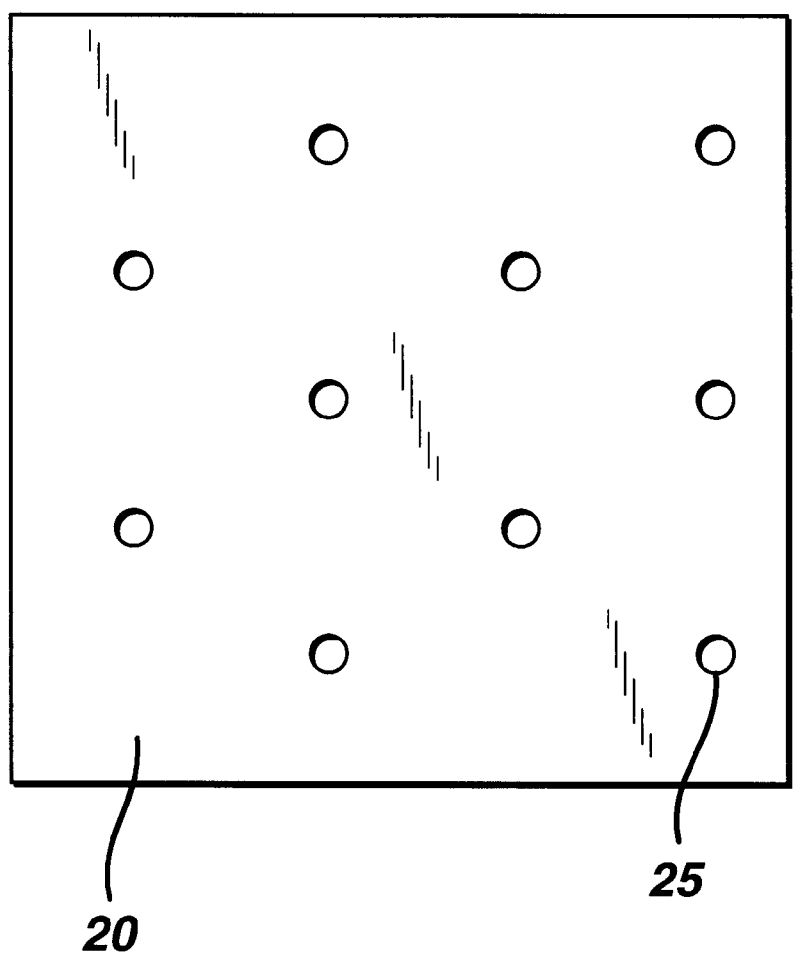
FIG. 2 is an elevational view of an unwrapped battery can having air access openings.

Referring to FIG. 2, the advantage of wet-proofing is demonstrated. With only 1% PTFE in the cathode mixture, the discharge efficiency of cathodes made with 1% PTFE is not substantially different for opened and closed cells. The cathode is soaked with electrolyte and air cannot enter to recharge the $MnO_2$.

Figure 3:
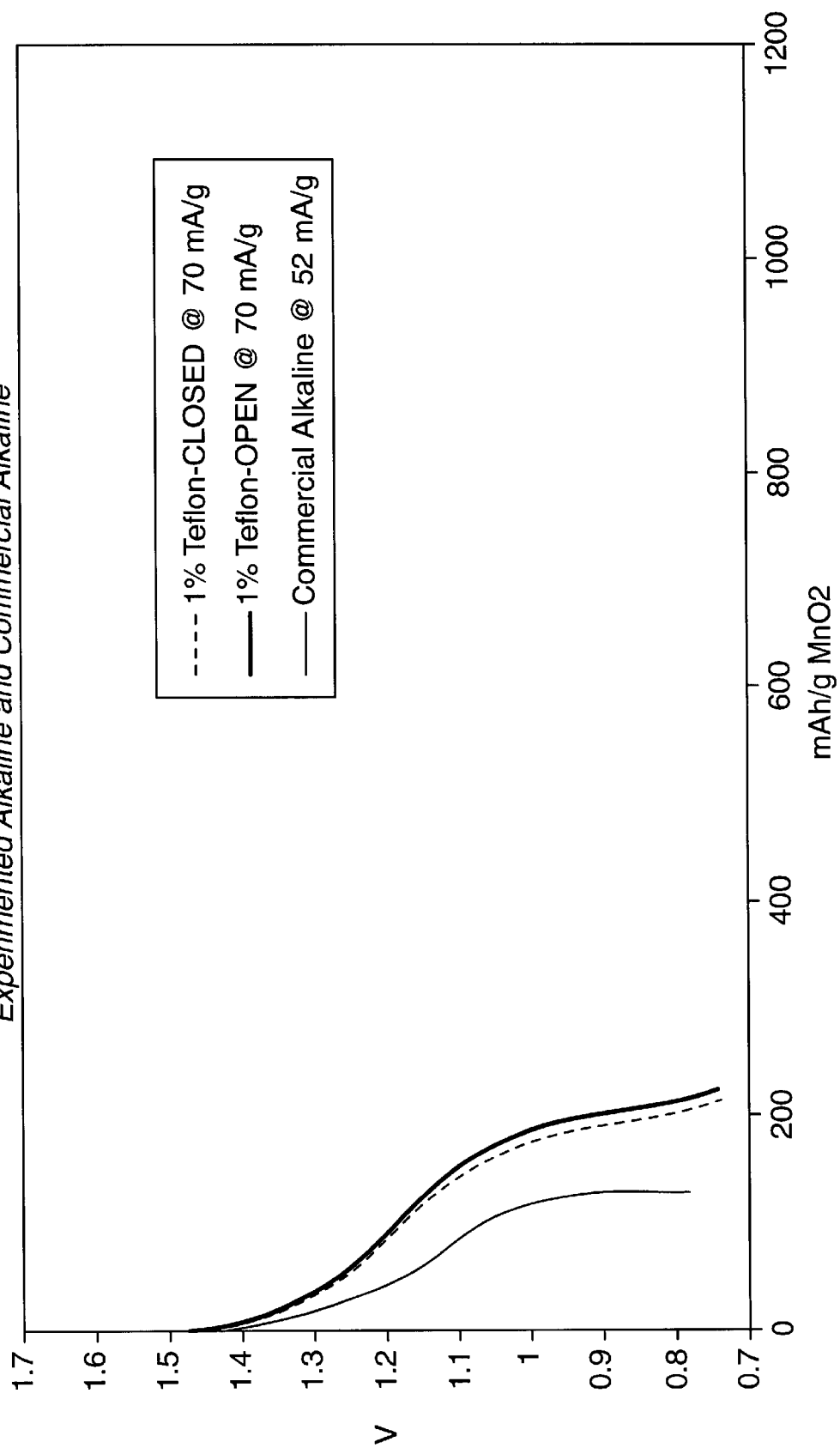
FIG. 3 is a graph showing voltage (V) vs. current (mA/g $MnO_2$) for open and closed cells made with cathodes containing 1% PTFE.
Figure 4:
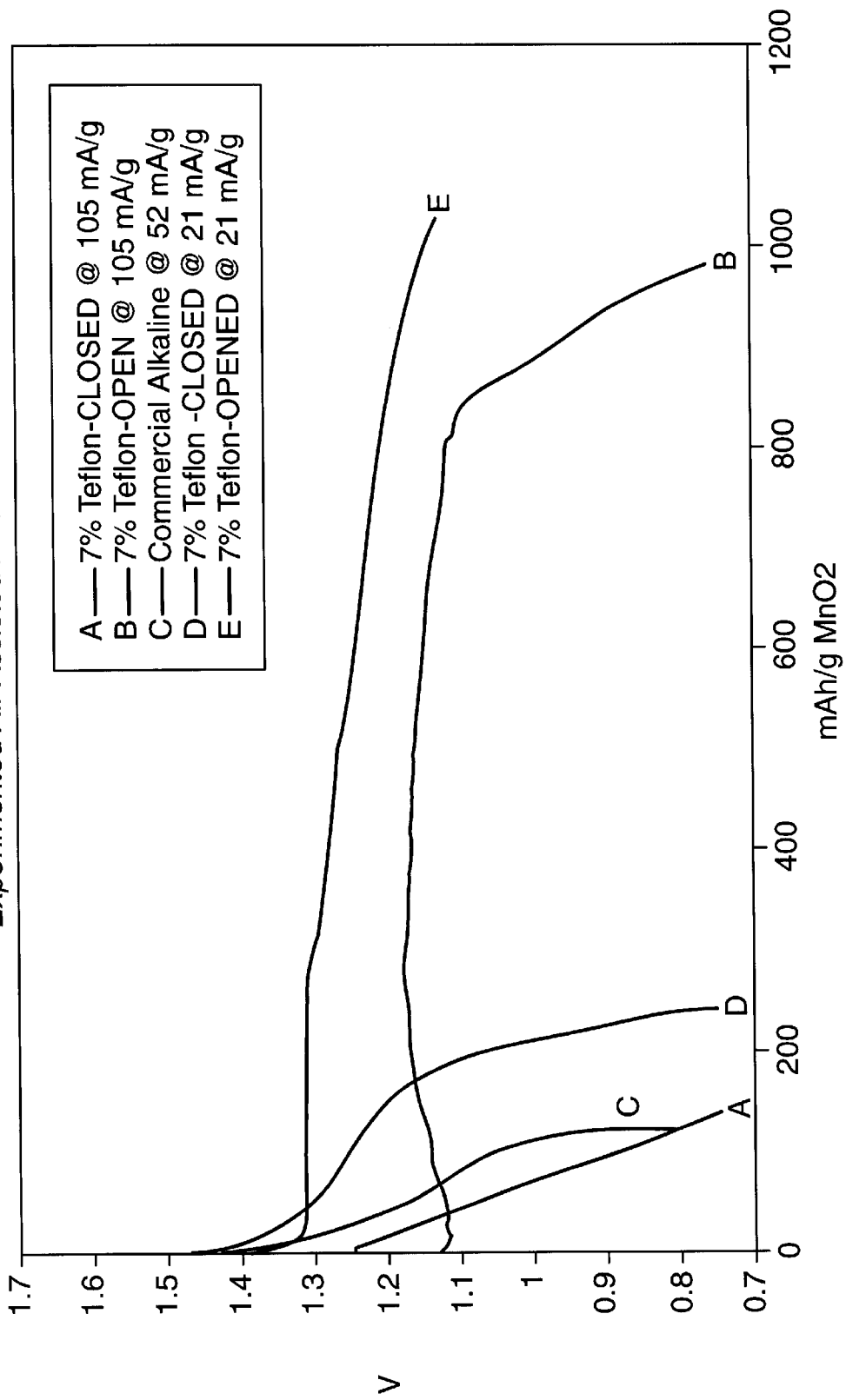
FIG. 4 is a graph showing voltage (V) vs. current (mA/g $MnO_2$) for open and closed cells made with cathodes containing 7% PTFE.

Referring to FIG. 3, when the amount of PTFE in the cathode is 7%, the discharge efficiency of $MnO_2$ in the opened cell is more than seven times higher than that in the closed cell. This result demonstrates that air can enter the cell and recharge the $MnO_2$. Preferably, cathode 50 includes between 2–25%, and more preferably between 2–7%, of PTFE.

Moreover, while a cathode 50 with inadequate electrolyte repellent may have good ionic conductivity, ionic concentration gradients may cause wetting or flooding and could be detrimental to gas diffusion properties and the recharge of $MnO_2$. Adding amounts of carbon between 5–15% can provide effective electronic and ionic conductivity. The carbon particles are high surface area carbon present in an amount effective to enable recharging of the $MnO_2$. The different types of carbon that may be used include, but are not limited to, Black Pearls 2000 (Cabot, Billerica, Mass.), Vulcan XC-72 (Cabot), Monarch 1300, Shawinigan Black, Printex, Ketjen Black, and PWA.

The cathode 50 is attached to the conductive tab 80, for example, by welding. The tab 80 provides better electrical contact between the cathode 50 and the bottom cup 90, as described below. The tab 80, about 0.1×3×15 mm, is typically a pure nickel flat stock. The cathode 50, with the tab 80 attached, is formed to fit inside the can 20. For example, if the battery is cylindrical, the cathode 50 can be wound on an appropriately-sized mandrel to form a cylindrical cathode assembly 30.

The cathode assembly 30 is wrapped with the barrier layer 60. As the battery 10 ages, electrolyte in the anode material 40 can travel through the cathode 50, for example, by wicking action through the cathode 50, and leak from the battery 10. The barrier layer 60, typically a 0.1 to 0.2 mm thick, air-permeable material such as PTFE, restricts the electrolyte from leaking out of the battery 10.

The barrier layer 60 is wrapped with the air diffusion layer 70. During discharge of the battery 10, zinc (Zn) from the anode 100 can be oxidized to zinc oxide (ZnO), increasing the volume of the anode 100 and pushing the cathode 50 against the side of the can 20. The air diffusion layer 70 helps to maintain an air diffusion space between the cathode 50 and the can 20 by restricting the cathode 50 from obstructing or plugging up the air access opening(s) 25 in the can 20, thereby allowing the battery 10 to recharge. The air diffusion layer 70 is typically a porous or fibrous material 0.1 to 0.2 mm thick, such as filter material (e.g., Whatman (Clifton, N.J.) Grades 54, F490-08, and F490-02).

Figure 5A:
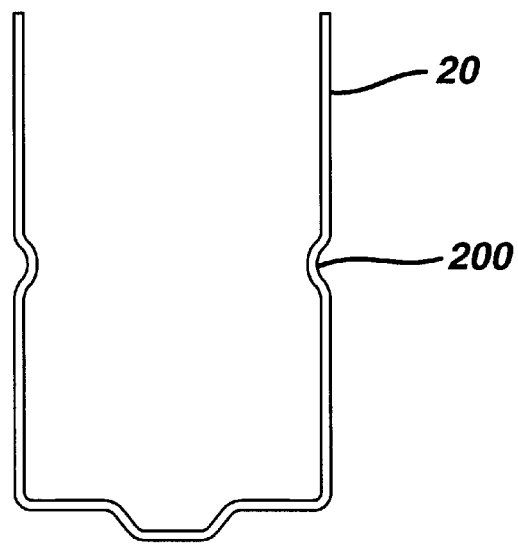
FIGS. 5A–B are cross-sectional views of battery cans having grooves.
Figure 5B:
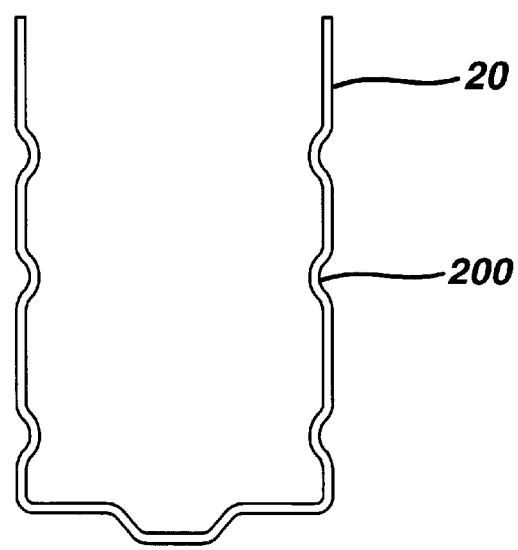

Alternatively, or in addition, to using the air diffusion layer 70, a groove 200 can be formed in the can 20 to restrict the cathode 50 from obstructing the air access openings 25, as shown in FIGS. 5A–B. The groove 200 typically extends into the can 20 about 0.1 to 0.2 mm, approximately the thickness of the air diffusion layer 70. As shown in FIG. 5A, the groove 200 can extend just around the center of the battery 10 since expanding anode material 100 typically bulges the center of the cathode assembly 30 the most. In another embodiment, shown in FIG. 5B, the battery 10 can include a plurality of grooves 200 spaced along the height of the battery 10. The groove 200 is typically formed after the battery 10 has been assembled so that the cathode assembly 30 can be inserted into the can 20. The can 20 is deformed by rolling the battery 10 around an indentation wheel.

The bottom cup 90 is placed on one end of the cathode assembly 30. The bottom cup 90 contains the cathode assembly 30, to minimize leakage of electrolyte and to provide better electrical contact between the cathode 50 and the can 20. The bottom cup 90 is fabricated to fit over an end of the cathode assembly 30 and into the can 20. For example, for a cylindrical battery 10, the bottom cup 90 may be shaped as a can having a bottom surface adapted to contact the can 20, as shown in FIG. 1. Additionally, the bottom cup 90 defines a groove 150 in which the cathode assembly 30 is placed. Prior to placing the bottom cup 90 on the cathode assembly 30, a sealant (not shown) is placed in the groove 150 as a barrier to restrict the electrolyte from leaking through the cathode assembly 30 and out of the battery 10. The sealant is typically an asphalt sealant such as Asphalt B1128, available from BiWax Corp. The bottom cup 90 is typically connected to the tab 80, for example, by welding. Welding secures the bottom cup 90 to the cathode assembly 30 and provides better electrical contact between the can 20, the bottom cup 90 and the cathode 50.

The separator 40 is placed in the cathode assembly 30. The separator 40 is used to contain the anode 100 and to electrically isolate the anode 100 from the cathode 50 so as not to short circuit the battery 10 by direct reaction of the cathode 50 and the anode 100. The separator 40, generally 0.05 to 0.08 mm thick, is typically a porous, electrically insulating polymer, such as polypropylene (Celgard 5550, Celanese (Summit, N.J.)) or polyvinylacrylate (PVA), that allows the electrolyte in the anode material 100 to contact the cathode 50. As shown in FIG. 1, the separator 40 can be a tube having an open end and a closed end. The separator 40 is formed on an appropriately-sized mandrel so as to fit inside the cathode assembly 30.

The top cup 130 is placed on the open end of the cathode assembly 30. As shown in FIG. 1, the top cup 130, typically made of a non-conducting material such as nylon, is sized to fit over the open end of the separator 40 and the cathode assembly 30, and to mate with the seal 120, as described below. As with the bottom cup 90, the top cup 130 defines a groove 170. Prior to placing the cathode assembly 30 in the top cup 130, an asphalt sealant (not shown) is placed in the groove 170 to act as a barrier against electrolyte leakage.

The cathode assembly 30 is placed into the can 20 such that the cathode 50 electrically contacts the can 20. The cathode 30 electrically contacts the can 20 via the tab 80 and the bottom cup 90. If the tab 80 and the:bottom cup 90 are not used, the cathode 30 can directly contact the can. In order for the cathode 30 to contact the can 20 directly, the cathode material is first cleared from the current collector. The current collector can then be welded to the can 20.

Anode material 100 is typically a gel containing a mixture including zinc, an electrolyte, and a gelling agent. The zinc content is between about 60 and 80 percent by weight, preferably about 70 percent by weight.. The electrolyte can be an aqueous solution of (9N) potassium hydroxide. The electrolyte can include between about 25 and 35 percent by weight, preferably about 30 percent of potassium hydroxide. The electrolyte can also include between about 1 and 2 percent of zinc oxide.

The gelling agent, described more below, helps prevent leakage of the electrolyte from the cell and helps suspend the particles of zinc.

The zinc material can be a zinc powder that is alloyed with lead, indium, aluminum, or bismuth. For example, the zinc can be alloyed with between 400 and 600 ppm (e.g., 500 ppm) of lead, between 400 and 600 ppm (e.g., 500 ppm) of indium, or between about 50 and 90 ppm (e.g., 70 ppm) of aluminum. The zinc material can be air blown or spun zinc.

Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt% on 60 mesh screen;
40–60 wt% on 100 mesh screen;
30–50 wt% on 200 mesh screen;
0–3 wt% on 325 mesh screen; and
0–0.5 wt% on pan.

Suitable zinc materials include zinc available from Union Miniere (Overpelt, Belgium), Duracell (USA), Noranda (USA), Grillo (Germany), or Toho Zinc (Japan).

The gelling agent preferably is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylate have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

After the anode material 100 has been placed in the can 20, a sealing assembly 160, including the support plate 110, the seal 120, and the current collector 140, is placed in the can 20. The sealing assembly 160 is provided to help prevent the anode material 100 from leaking, to seal the battery 10, and to electronically connect the anode 100 to an external circuit when the battery 10 is used in a device. The support plate 110, made of an electrical conductor dimensioned to fit in the seal 120, is in electrical contact with the current collector 140. The current collector 140, typically a rod or nail, is made of an electrically conducting material, such as brass, that is able to resist the corrosive effects of the anode material 100. The current collector 140 is also fabricated to mate with the seal 120, which is typically made of a non-conductive material such as nylon. As shown in FIG. 1, the seal 120 is fabricated to receive the current collector 140 and to mate with the top cup 130 such that the anode material 100 does not leak from the battery 10.

The battery 10 is sealed by mechanically crimping the can 20 over the support plate 110. The assembled battery 10 is placed in an appropriately-sized die, and the rim of the can 20 is mechanically crimped over the support plate 110 and seal 120, sealing the battery 10. Additionally, to prevent the battery 10 from leaking during storage, e.g., due to expansion and contraction of the battery 10, sealing the can 20 may include providing along the crimp a sealant, e.g., asphalt sealant (BiWax Corp.).

The resulting battery has the same overall shape and dimensions as a corresponding alkaline cell and can therefore be used in the same applications as an alkaline cell.

EXAMPLE

A cylindrical air recovery battery (AA) was prepared as follows. A cathode plaque was cut to the desired dimensions, depending on the size of the battery. A 4 to 5 mm wide area on the lower left corner of the cathode was scraped to expose the current collector (grid). A tab, about 10 mm long, was welded to the exposed current collector. To ensure a tight curl on a cathode mandrel, the cathode was pre-curled around a first mandrel having a diameter smaller than the diameter of the cathode mandrel. A bottom cup was welded to the tab. The cathode was placed on the cathode mandrel as tightly as possible.

A pre-cut Teflon layer was stretched to about 5% longer than the cut length. The Teflon layer was wrapped around the cathode, pulling the layer to ensure a tight fit. An air diffusion layer, consisting of filter paper, was wrapped around cathode, adjacent to the Teflon layer. Using a syringe, a sealant was spread in the bottom cup. The cathode was slid (about 2–3 mm) off the cathode mandrel, and an end of the cathode was folded in slightly to facilitate fitting the cathode into the bottom cup. The bottom cup was placed on the end of the cathode, making sure that the cathode, Teflon layer, and filter paper were held inside the bottom cup.

An O-ring was placed around the cathode to preserve the shape of the cathode, and the cathode was removed from the mandrel. A pre-cut separator was inserted into the cathode. Using a syringe, sealant was spread in a top cup. The top cup was placed on another end of the cathode, making sure that the cathode, Teflon layer, and filter paper were held inside the top cup. The cathode was inserted into the battery can.

Anode material was placed in the cathode assembly. The current collector was welded to the support plate to form a subassembly. The current collector was insert through the seal. Sealant was placed on the seal to provide added protection against leakage of electrolyte. The subassembly and the seal were placed on the top cup. The battery was placed in an appropriately-sized die, and the battery was sealed by mechanically crimping the edge of battery can over the seal and the support plate.

All publications and patents mentioned in this application are herein incorporated by reference to the same extent as if each individual publication or patent was specifically and individually indicated to be incorporated by reference.

Other embodiments are within the claims.

What is claimed is:

1. An air recovery battery comprising:

a can having an endwall and a sidewall;

at least one air access opening in the sidewall of the can;

anode material disposed inside the can; and a cathode assembly having a cathode disposed inside the can, the cathode capable of being recharged by atmospheric oxygen.

2. The battery of claim 1, wherein the cathode assembly includes a barrier layer.

3. The battery of claim 1, wherein the can includes a groove.

4. The battery of claim 1, wherein the cathode assembly includes an air diffusion layer.

5. The battery of claim 1, wherein the cathode assembly is connected to a tab.

6. The battery of claim 1, wherein the cathode assembly contacts a bottom cup.

7. The battery of claim 1, wherein the cathode assembly includes manganese dioxide.

8. The battery of claim 1, wherein the anode material includes zinc.

9. The battery of claim 1, wherein the battery is a cylindrical battery.

10. The battery of claim 1, further comprising at least one air access opening in the endwall of the can.

11. The battery of claim 1, wherein the air access opening is a circular opening.

12. The battery of claim 1, wherein the sidewall of the can and the cathode assembly define a gap therebetween.

* * * * *

UNITED STATES PATENT AND TRADEMARK OFFICE
CERTIFICATE OF CORRECTION

PATENT NO. : 6,372,370 B1
DATED : April 16, 2002
INVENTOR(S) : Alexander Kaplan and Viet Vu It is certified that error appears in the above-identified patent and that said Letters Patent is hereby corrected as shown below:

<u>Title page,</u>
Item [57], ABSTRACT, delete "An air recovery battery is disclosed along with a method of assembling a battery including (a) inserting a cathode assembly in a can having a wall, the wall having at least one air access opening; (b) placing anode material in the can; (c) inserting a seal assembly into the can, the seal assembly having a current collector; and (d) sealing the can." and replace with -- A method of assembling a battery includes (a) inserting a cathode assembly in a can having a wall, the wall having at least one air access opening; (b) placing anode material in the can; (c) inserting a seal assembly into the can, the seal assembly having a current collector; and (d) sealing the can. --

Signed and Sealed this

Fourteenth Day of January, 2003

JAMES E. ROGAN
*Director of the United States Patent and Trademark Office*